Jan. 17, 1950 W. H. FORSTER 2,494,751

ASYMMETRICAL DISCRIMINATOR

Filed March 10, 1947

INVENTOR.
WILLIAM H. FORSTER
BY
Brown, Denk & Synnestvedt
AGENTS

Patented Jan. 17, 1950 2,494,751

UNITED STATES PATENT OFFICE 2,494,751

ASYMMETRICAL DISCRIMINATOR

William H. Forster, Philadelphia, Pa., assignor to Philco Corporation, Philadelphia, Pa., a corporation of Pennsylvania Application March 10, 1947, Serial No. 733,498

6 Claims. (Cl. 250—27)

Figure 1:
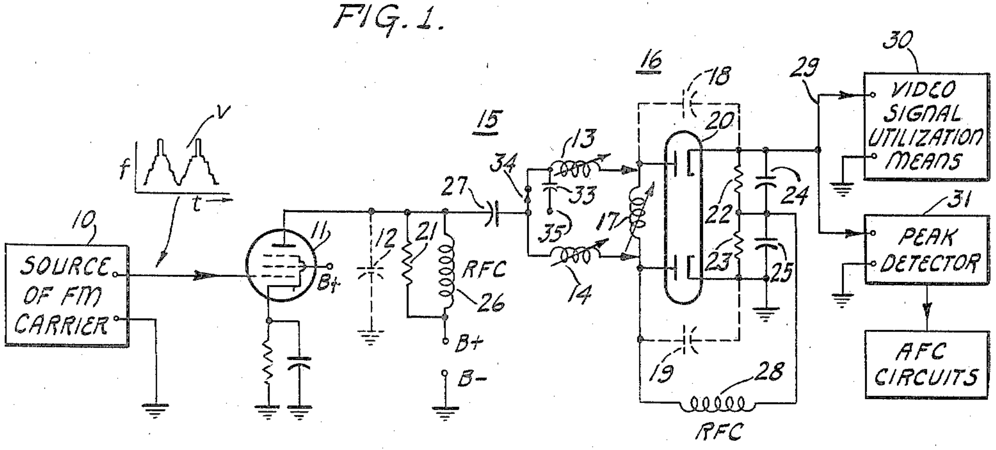

The invention herein described and claimed relates to a new and improved dual-purpose frequency-discriminator circuit employing inductive susceptance coupling.

When employed in a preferred manner in a frequency-modulated (FM) television system or other wide-band high-frequency asymmetrically-modulated FM system, the circuit of the present invention serves the following purposes: one, the circuit operates as a high-gain wide-band frequency discriminator to detect the video-modulated I-F, or other carrier-frequency, FM signals; and two, the circuit provides an automatic-frequency-control (AFC) voltage which is utilized in known manner to maintain the frequency-modulated I-F or other FM carrier accurately positioned within a preassigned frequency band.

To accomplish the dual purposes mentioned above, the circuit of the present invention is so constructed, and the parameters are so chosen, that the frequency-response characteristic thereof is steeply sloped and substantially linear over the desired wide band of frequencies. In addition, the circuit is so constructed and so tuned that the frequency-response characteristic is asymmetrical, with the zero-crossover occurring close to one end of the linear portion of the characteristic at a frequency which corresponds substantially to one edge of the operating pass-band.

With the frequency-response characteristic thus oriented with respect to the crossover line, only a small end-portion of the linear portion of the characteristic is used for AFC purposes, and the larger part of the linear portion of the characteristic is available for detection purposes. The gain of the discriminator, realizable over a wide band of frequencies, is therefore substantially larger than would be realized if the crossover occurred at or near the mid-point of the linear slope. In the latter case, if the crossover region be utilized for AFC purposes, as ordinarily would be necessary, only about one-half of pass-band of the discriminator would be usable for detection, and the discriminator would have to be so constructed as to have a pass-band twice as wide as actually required for detection. And as is known by those skilled in the art, the wider the pass-band of the discriminator, the less steep the slope of the frequency-response characteristic, and the smaller the gain.

It is an object of this invention to provide a high-frequency wide-band frequency-discriminator circuit having an asymmetrical frequency-response characteristic.

It is another object of this invention to provide a frequency discriminator whose frequency-response characteristic includes a steeply-sloped linear portion extending over a relatively wide band of frequencies, with the linear portion having a crossover close to one end thereof at a frequency corresponding substantially to one edge of the operating pass-band.

It is a specific object of this invention to provide, for use in FM television circuits, a high-gain frequency-discriminator circuit which will perform the dual function of detection and of providing an AFC voltage.

Figure 2:
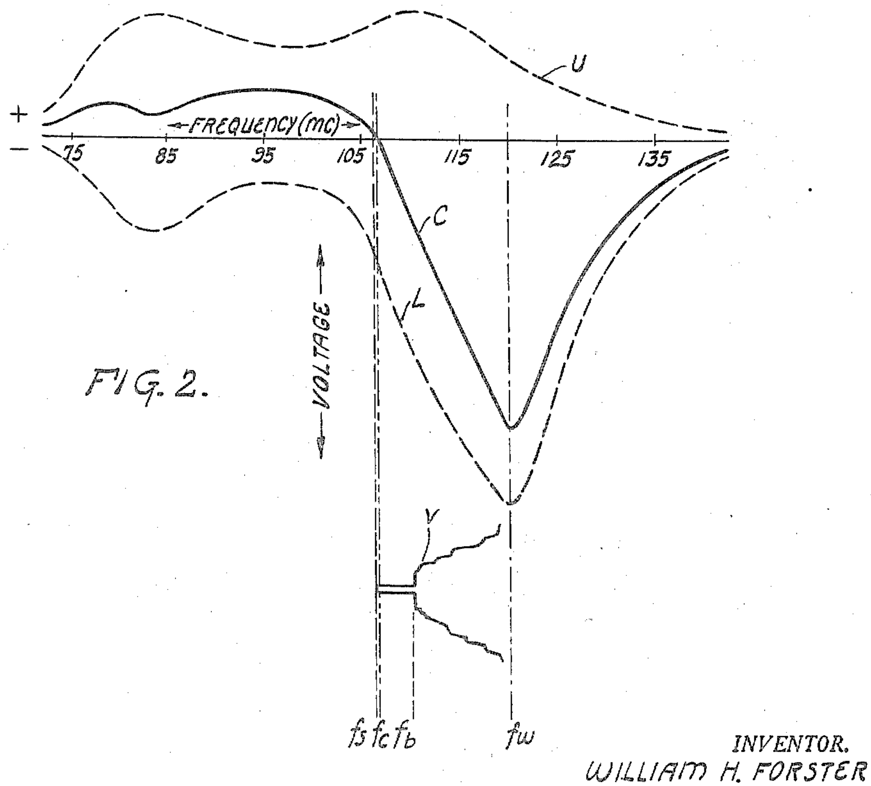

These and other objects, advantages and features of the invention will become clear from the following detailed description and from the drawings wherein:

Figure 1 is a schematic representation of a preferred form of frequency discriminator embodying the invention and adapted for use in the preferred manner, i. e. adapted for use in a television system as a video detector and as a source of AFC voltage; and Figure 2 is a graphical representation of the frequency-response characteristics of the circuit shown in Figure 1 when said circuit is operated in a preferred manner.

Referring now to Figure 1, there is shown a block 10 representing a source of frequency-modulated carrier wave whose frequency variations are represented, in the drawing, by a graph V in which instantaneous carrier frequency $f$ is plotted against time $t$. In the description which follows it will be assumed that graph V is representative of the video-frequency intelligence carried by a frequency-modulated television carrier wave supplied by source 10 and applied to the control grid of a driver tube 11. Capacitance 12 represents the inherent distributed capacitance of the plate circuit of driver tube 11. Inductances 13 and 14, connected as shown, serve as coupling elements for susceptively coupling the output of tube 11 to the input electrodes of twin-diode 20. Inductances 13 and 14 also constitute the inductance elements of a primary tuned circuit 15 comprised of capacitance 12 in shunt with the said inductances. Observe that the primary tuned circuit 15 includes no inductance element (other than the elements 13—14) which resonates with capacitance 12 at the operating frequencies. Inductance elements 13—14 also function as shunt elements in a secondary tuned circuit 16 comprised of inductance 17 (shunted by inductances 13—14), capacitance 18 and capacitance 19. In Figure 1, capacitances 18 and 19 represent the interelectrode and socket capacitances of the upper and lower diodes respectively of twin-diode 20.

Resistor 22 and capacitor 24 comprise an RC network which, in cooperation with the upper diode of tube 20, function in known manner as the video detector unit of the upper portion of the discriminator. Similarly, resistor 23 and capacitor 25 comprise the RC network which, together with the lower diode, function as the video detector unit of the lower portion of the discriminator. The reactances of capacitors 24 and 25 at the operating carrier frequency are ordinarily very small, and the cathodes of both diodes may be deemed to be at ground potential with respect to the carrier frequency. The value of each of the resistors 22 and 23 is determined by the RC time constant required in order for the network to accomplish video detection.

Resistor 21, connected in shunt across primary circuit 15, is a damping resistor whose size determines the Q of the primary tank circuit 15. The Q of secondary tank circuit 16 is largely determined by resistors 22 and 23; these resistors constitute a load on the secondary tank circuit, approximately one-half of the combined value of resistors 22 and 23 being reflected across the diodes into the secondary circuit.

Radio-frequency choke 26 isolates the source of positive plate potential, B+, from the carrier-frequency currents; and blocking capacitor 27 isolates the anodes of twin-diode 20 from the positive plate voltage, B+. Radio-frequency choke 28 provides a D.-C. path for the currents which flow through the diodes of tube 20. It should be mentioned here that, in many cases, crystal diodes, for example of the type 1N34 germanium diode, may be substituted advantageously for the twin-diode tube 20.

Referring now to Figure 2, there is shown the preferred frequency-response chaarcteristic C of the discriminator circuit of Figure 1; and shown in dotted lines are the frequency-response characteristics U and L of the upper and lower portions of the discriminator circuit which together produce the resultant characteristic C. In other words, characteristic C is indicative of the detected video voltage appearing between the cathode of the upper diode and ground, i. e. across series-combined resistors 22 and 23. Characteristic U is indicative of the unidirectional video voltage appearing across resistor 22 alone, while characteristic L is indicative of the unidirectional voltage across resistor 23 alone.

To facilitate description of the present invention, it will be assumed that the circuit of Figure 1 is employed in a frequency-modulation television system whose carrier occupies a frequency band extending from 107 to 119 mc. inclusive. In Figure 2, the preasssigned white-level frequency of the picture-intelligence component is shown to be 119 mc. and is represented by the dot-and-dash line $f_w$. The preassigned black-level, or blanking-level, frequency of the picture-intelligence component is 111 mc. and is represented by the dotted line $f_b$; the preassigned synchronizing-level frequency of the synchronizing pulse is 107 mc. and is represented by the dash line $f_s$. The modulated picture-intelligence component varies widely, i. e. over an eight megacycle band between the frequency limits 111–119 mc., but the peaks of the time-spaced synchronizing pulses are leveled, or intended to be leveled, accurately at 107 mc.

I will now describe the manner of determining, to a first order of approximation, the values required of the pertinent circuit parameters in order that the circuit of Figure 1 may have the frequency-response characteristic shown in Figure 2 for the pass-band indicated. As will be understood, the values of distributed capacitances 12, 18 and 19 are fixed by the physical properties of the circuit, particularly by the type of tubes employed. The values of resistances 22 and 23 are fixed by time-constant considerations as previously indicated; these resistors are ordinarily of relatively low value, and secondary circuit 16 accordingly has a low Q factor. A low Q factor is desirable for this secondary circuit, but in some cases it may be desirable to raise the Q slightly, as by increasing the value of shunt capacitances 18—19. The value of resistor 21 is preferably high in order that the Q factor of primary circuit 15 may be substantially higher than that of the secondary circuit 16.

Several conditions must be met with respect to the values required for inductances 13, 14 and 17. The first condition, for reasons that will become clear, is that the value of inductance 13 must be appreciably different from that of inductance 14; for example, inductance 13 may be from 1.5 to 2 times as large as inductance 14. The second condition is that inductances 13 and 14 (considered as being parallel-combined and grounded at the input electrodes of tube 20) should resonate with capacitance 12 at about 115 mc., i. e. at a frequency about midway between the upper-frequency peaks of characteristics U and L respectively. The third condition is that the combination, comprising series-connected inductances 13—14 in shunt with inductance 17 and with series-connected capacitances 18—19, should resonate at a frequency of about 105 mc., i. e. at a frequency about midway between the two peaks of characteristic L. If these conditions are met, the values of inductances 13, 14 and 17 will be established to a first order of approximation.

With the circuit connected as shown in Figure 1, and with the circuit elements having values of the order of magnitude indicated above, a sweep frequency may be applied to the discriminator circuit, and variable inductances 13, 14 and 17 may then be so adjusted that the frequency responses of the voltages appearing across resistors 22 and 23 individually, and across the series combination thereof, are substantially as desired. In the present illustration, the desired frequency responses are depicted in Figure 2 by characteristics U, L and C, respectively.

It will be seen from the general nature of frequency-response curves U and L that the action of the circuit of Figure 1 simulates a pair of double-tuned circuits arranged in parallel relation, and if desired the circuit may be considered to be the equivalent thereof. That is to say, the action of primary tuned circuit 15 simulates a pair of fictitious tuned circuits in parallel, i. e. an upper and a lower tuned circuit; and the action of secondary tuned circuit 16 likewise simulates a pair of tuned circuits. Thus, the fictitious upper circuit of primary circuit 15 and the fictitious upper circuit of secondary circuit 16 comprise an imaginary double-tuned upper circuit; and the fictitious lower circuits of primary and secondary circuits 15 and 16 comprise an imaginary double-tuned lower circuit. While each of the two imaginary double-tuned circuits is effected by the other, and is not independent thereof, the curves U and L of Figure 2 may be considered to be generally indicative of the frequency-response characteristics of said imaginary upper and lower double-tuned circuits, respectively.

Characteristic L of the imaginary lower double-tuned circuit is seen to be a double-peaked curve, the upper-frequency peak of which is of considerably greater amplitude than the lower, the upper-frequency peak occurring at 119 mc. and the lower-frequency peak occurring at 85 mc. A characteristic having this general shape is to be expected from the fact that the fictitious lower primary and lower secondary circuits have substantially different Q factors, are tuned to substantially different frequencies, and are relatively closely coupled.

Frequency-response characteristic U of the upper double-tuned circuit is seen to be a double-peaked curve, the peaks of which are of substantially equal amplitude and noticeably closer together than the peaks of characteristic L. The proximity of the peaks of characteristic U indicates that the imaginary upper double-tuned circuit is more loosely coupled than the imaginary lower double-tuned circuit, as is the case, since inductance 13 is 1.5 to 2 times as large in value as inductance 14. In view of the fact that the Q factors of the imaginary upper primary and upper secondary circuits are quite dissimilar, the symmetry of characteristic U is explainable as follows: when the relative values of inductances 13, 14 and 17 are finally established at the time of the final adjustment thereof and frequency-response characteristics having the shapes shown in Figure 2 are produced, the fictitious upper primary and upper secondary circuits are believed to be tuned, in effect, to substantially the same frequency.

In the present illustration, inductances 13, 14 and 17 are so adjusted, and the value of resistor 21 is so selected, that characteristic C has a linear portion extending over the frequency band 107–119 mc. (which is the frequency band of the video-intelligence component of the incoming wave from source 10) with a crossover frequency $f_c$ at 107.4 mc. (which is but very slightly higher than 107 mc., the preassigned synchronizing-level frequency).

The manner in which detection of the frequency-modulated I-F video-intelligence signals of the wave from source 10 is accomplished along the linear portion of the frequency-response characteristic C will be readily understood by those skilled in the art and need not be described here. The video signals delivered by the discriminator may be applied, as by way of conductor 29, to a video signal utilization means 30 which may, for example, comprise the video circuits of a television receiver, or the monitoring circuits of a television transmitter or relay station.

The manner in which automatic frequency control may be achieved is similar to that described in detail in a joint copending application of Wilson P. Boothroyd and mine, filed September 19, 1946, Serial No. 698,056; and the discriminator of the present invention may be advantageously employed in lieu of the discriminator identified in Figure 1 of the said copending aplication by the reference numeral 9.

In practicing the present invention, a discriminator circuit was built in accordance with the embodiment illustrated in Figure 1 and used in a frequency-modulation television relay system similar to that described in the above-mentioned copending application. The passband of the system is from 105 to 125 mc. In the discriminator circuit, tube 11 comprises a 6AK5 pentode, and twin-diode 20 is a 6AL5. The distributed capacitance of the plate circuit, represented in Figure 1 by capacitance 12, is of the order of 6 $\mu\mu$f. Resistor 21 has a value of 18,000 ohms, blocking capacitor 27 is of the order of 250 $\mu\mu$f., inductance 13 has an adjusted value of 0.8 $\mu$h., inductance 14 has an adjusted value of 0.5 $\mu$h., inductance 17 has an adjusted value of 1.1 $\mu$h., interelectrode capacitances 18, 19 are of the order of 6 $\mu\mu$h. each, resistors 22, 23 are 1,000 ohms each, and capacitors 24, 25 are 10 $\mu\mu$f. each. The frequency-response characteristic of the voltages appearing across resistor 22 was substantially similar to characteristic U of Figure 2; and the frequency-response characteristic of the voltages appearing across resistor 23 was substantially similar to characteristic L.

The procedure employed in aligning the particular discriminator described in the above paragraph is very simple. A continuous wave of the crossover frequency (approximately 107.4 mc.) is applied to the discriminator, and secondary inductance 17 is tuned for zero discriminator output, as read on a D.-C. voltmeter connected across series-combined resistors 22—23. Then a continuous wave of the frequency of the upper-frequency peak (119 mc.) is applied, and inductance 14 is tuned for maximum discriminator output, again as read on a D.-C. voltmeter across resistors 22—23. A continuous wave of crossover frequency (107.4 mc.) is again applied and, if the discriminator output is other than zero, as it may be by a small amount, inductance 17 is adjusted until zero output is obtained. A continuous wave of the upper-frequency peak (119 mc.) is then again applied and inductance 14 may again be adjusted for maximum discriminator output. The adjustment required should, however, be slight. If a wave of crossover frequency (107.4 mc.) be again applied, the discriminator output will, in most instances, be zero. If it isn't, inductance 17 may be further adjusted. Usually, however, this will not be necessary. Stated briefly, inductances 17 and 14 are adjusted until zero and maximum discriminator output are obtained at 107.4 mc. and 119 mc., respectively. Ordinarily, not more than two adjustments of each inductance will be required to achieve this condition. It is to be observed that the adjustment of inductance 13 is not disturbed during the alignment of the circuit.

If desired, the circuit illustrated in Figure 1 may be so arranged and operated as to have a frequency-response characteristic which is the inverse or mirror-image (about the abscissas axis) of that shown in Figure 2, in which case the small end-portion of the linear slope will be in the region of negative polarity and the larger portion of the linear slope will be in the region of positive polarity. This may be readily accomplished, either by reversing the individual rectifier elements or by coupling the upper double-tuned circuit more closely than the lower, i. e., reversing the positions of coupling inductances 13 and 14 of Figure 1 to place the smaller of the two inductances in the upper circuit.

If desired, a frequency-response characteristic having a crossover at the upper-frequency instead of at the lower, i. e. having a linear portion which increases in voltage as the frequency decreases rather than as the frequency increases as in Figure 2, may be obtained by moving the upper-frequency peak of characteristic U to the right to the extent necessary to make substantially linear that portion of characteristic C which in Figure 1 is to the right of the upper-frequency peak, with a crossover occurring at a frequency of say 135 mc. The upper-frequency peak of characteristic U may be moved to the right, to the extent required, by inserting capacitance in series with the coupling inductance of the more loosely coupled double-tuned circuit to cause the series combination to be resonant at the required frequency. In Figure 1, capacitor 33 may be placed in series with inductance 13 by moving switch 34 to contact point 35. In a circuit having parameters of the magnitude hereinbefore indicated, employable at the frequencies mentioned, capacitor 33 may be of the order of 1.0 $\mu\mu$f.

By suitable choice of values, a frequency-response characteristic similar to that of curve U of Figure 2 may also be obtained with capacitor 33 in the circuit, but I prefer to omit capacitor 33 when a characteristic having a linear portion similar to that of curve C is desired.

From the detailed description given above, it will be clear to those skilled in the art that by suitable selection of circuit constants, various widths of pass-band at various center frequencies may be had. Moreover, various modifications, not involving invention, will occur to those skilled in the art.

Having described my invention, I claim:

1. A band-pass frequency-discriminator circuit comprising: a source of frequency-modulated carrier wave; first and second rectifying detectors, each having at least input and output electrodes; means providing capacitance in shunt with said source; a first inductance coupling said source to an input electrode of said first detector; a second inductance coupling said source to an input electrode of said second detector, said second inductance having a value substantially higher than that of said first inductance and such that the parallel combination of said first and second inductance resonates with said source shunt capacitance at a frequency corresponding substantially to the mid-frequency of said pass-band; means providing capacitance between said input and output electrodes of each of said detectors; a third inductance coupled between the input electrodes of said detectors, said third inductance being of such value that, in shunt with said first and second inductance series connected, said combination of inductances resonates with said last mentioned capacitances at a frequency corresponding substantially to a frequency limit of said pass-band; and means for combining the rectified voltages differentially.

2. In a communication system having a source of frequency-modulated carrier voltage, a frequency-discriminator circuit having an asymmetrical D.-C. voltage versus frequency characteristic which is substantially linear over the operating pass-band with a point of zero D.-C. voltage occurring on the linear portion close to one extremity thereof, said discriminator circuit comprising: a pair of rectifying detectors having input and output electrodes; means providing capacitance in shunt with said source of carrier voltage; a first inductance coupled between said source and the input electrode of one of said detectors; a second inductance and a second capacitance series coupled between said source and the input electrode of the other of said detectors; means providing capacitance between said input and output electrodes of each of said detectors; a third inductance coupled between the input electrodes of said detectors; and means for combining the rectified voltages differentially.

3. A frequency-discriminator circuit as claimed in claim 2 characterized in that said second inductance and second capacitance are series resonant at a frequency higher than the zero D.-C. voltage frequency and such that said zero D.-C. voltage occurs at the desired frequency.

4. A band-pass frequency-discriminator circuit comprising: a source of frequency-modulated carrier wave, said source having inherent distributed shunt capacitance; first and second rectifying detectors each having input and output electrodes and inherent interelectrode capacitance; a first inductance coupling said source to an input electrode of said first detector; a second inductance coupling said source to an input electrode of said second detector, said second inductance having a value substantially higher than that of said first inductance and such that the parallel combination of said first and second inductances resonates with said inherent distributed shunt capacitance of said source at a frequency corresponding substantially to the mid-frequency of said pass-band; a third inductance coupled between the input electrodes of said detectors, said third inductance being of such value that, in shunt with said first and second inductances series connected, said combination of inductances resonates with said inherent interelectrode capacitances of said detectors at a frequency corresponding substantially to a frequency limit of said pass-band; and means for combining the rectified voltages differentially.

5. A band-pass frequency-discriminator circuit as claimed in claim 4, characterized in that the frequency limit of said pass-band, at which said combination of first, second and third inductances resonates with said interelectrode capacitances, is the lower frequency limit.

6. A band-pass frequency-discriminator circuit as claimed in claim 1, characterized in that the frequency limit of said pass-band, at which said combination of first, second and third inductances resonates with said last-mentioned capacitances, is the lower frequency limit.

WILLIAM H. FORSTER.

REFERENCES CITED

The following references are of record in the file of this patent:

UNITED STATES PATENTS

| Number | Name | Date |
|---|---|---|
| 2,173,907 | Kirkwood | Sept. 26, 1939 |
| 2,265,826 | Wheeler | Dec. 9, 1941 |
| 2,312,070 | Bliss | Feb. 23, 1943 |
| 2,422,513 | Yeandle | June 17, 1947 |